(12) United States Patent
Jacoby

(10) Patent No.: US 9,408,499 B2
(45) Date of Patent: Aug. 9, 2016

(54) COOKING UTENSIL HOLDING DEVICE

(71) Applicant: Jimmy Jacoby, El Paso, TX (US)

(72) Inventor: Jimmy Jacoby, El Paso, TX (US)

( * ) Notice: Subject to any disclaimer, the term of this patent is extended or adjusted under 35 U.S.C. 154(b) by 0 days.

(21) Appl. No.: 14/661,743

(22) Filed: Mar. 18, 2015

(65) Prior Publication Data

US 2015/0265103 A1 Sep. 24, 2015

Related U.S. Application Data

(60) Provisional application No. 61/954,671, filed on Mar. 18, 2014.

(51) Int. Cl.
*A47J 43/28* (2006.01)
*B65D 25/28* (2006.01)
*A47J 27/00* (2006.01)
*B44D 3/12* (2006.01)

(52) U.S. Cl.
CPC ............... *A47J 43/287* (2013.01); *B65D 25/28* (2013.01); *B44D 3/123* (2013.01)

(58) Field of Classification Search
CPC ........ A47J 43/287; A47J 47/16; A47G 21/14; A47G 21/145; B44D 3/123; B65D 25/28
See application file for complete search history.

(56) References Cited

U.S. PATENT DOCUMENTS

| 807,840 | A |   | 12/1905 | Martin |          |
|---------|---|---|---------|--------|----------|
| 1,483,833 | A |   | 2/1923 | Potter |          |
| 1,464,731 | A | * | 8/1923 | Swift  | 248/37.6 |
| 1,627,575 | A | * | 5/1927 | Rovelli | 248/37.6 |
| 2,368,898 | A | * | 2/1945 | Swift, Jr. | 248/37.6 |
| 2,371,537 | A | * | 3/1945 | Mangini | 248/37.6 |
| 2,483,724 | A | * | 10/1949 | Butler | 248/37.3 |
| 2,900,151 | A | * | 8/1959 | Sims | 248/37.3 |
| 5,105,963 | A |   | 4/1992 | Scott |          |
| 5,127,616 | A |   | 7/1992 | Carney |          |
| 5,518,211 | A |   | 5/1996 | Gaskill et al. |   |
| 5,678,790 | A | * | 10/1997 | Dwyer | 248/37.6 |
| 5,715,570 | A | * | 2/1998 | Hyun | 248/37.6 |
| 5,823,483 | A |   | 10/1998 | Gaskill |        |

* cited by examiner

*Primary Examiner* — Andrew Perreault
(74) *Attorney, Agent, or Firm* — Daniel Boudwin; Global Intellectual Property Agency

(57) ABSTRACT

A utensil holding device for pots, pans, and other cooking vessels. The device includes a pot or pan having an elongated handle extending therefrom. A first support arm is slidably and pivotally secured to the handle, and a second support arm is pivotally affixed to the handle. The first and second support arms are each connected to the handle via hinges that allow the support arms to rotate between folded and extended configurations. In the extended configuration, the handle of a utensil can be secured between the first and second support arms so as to hold the utensil in place above the rim of the pot or pan. In this way, the present invention eliminates the need for a user to place the utensil on a counter or stovetop and suspends the utensil above the pot or pan for convenient access by the user.

2 Claims, 3 Drawing Sheets

COOKING UTENSIL HOLDING DEVICE

CROSS REFERENCE TO RELATED APPLICATION

This application claims the benefit of U.S. Provisional Application No. 61/954,671 filed on Mar. 18, 2014, entitled "Pot and Pan Utensil Holder." The above identified patent application is herein incorporated by reference in its entirety to provide continuity of disclosure.

BACKGROUND OF THE INVENTION

Field of the Invention

The present invention relates to a utensil holding device. More specifically, the present invention provides a utensil holding device for pots, pans, and the like. The utensil holding device is adapted to provide a pot or pan having a means for holding a utensil thereon so as to prevent the user from placing the utensil in the pot or pan, or on a stovetop or countertop. The utensil holding device supports the utensil along the handle of the pot or pan and suspends the utensil above the pot or pan.

Cooking utensils such as spatulas, spoons, and ladles, among others, are often used when preparing food in a pot or pan on a stovetop. A spoon may be used to stir ingredients placed within a pot that is being heated on the stovetop, or a spatula may be used to move or flip meat on a pan. When the cooking utensil is no longer required, the cooking utensil is often placed on the stovetop or countertop. However, the cooking utensil may drip onto the countertop creating a mess. Further, the cooking utensil may have germs and bacteria thereon if the utensil was used to contact raw or uncooked meat. Thus, placing the cooking utensil on the countertop or stovetop creates an unsanitary cooking environment and may spread germs and bacteria. Similarly, if the kitchen countertop is not clean, the utensil may become dirty or unsanitary when placed thereon.

Alternatively, cooking utensils may simply be positioned within the pot or pan when the user is not using the utensil. However, a metal utensil may become hot when positioned within the pot or pan that is being heated. As a result the user may burn himself or herself accidentally, and the user may have to wait for the utensil to cool. If the utensil is composed of plastic, the utensil may melt if exposed to the heated pot or pan for an extended period of time. This may cause plastic to leech or melt into the food being prepared in the pot or pan, contaminating the food. Additionally, if the utensil burns or melts, the utensil may no longer be usable and may need to be replaced.

The present invention provides a utensil holding device for pots, pans, and the like. The device includes a pot or pan having an elongated handle. A first support arm is slidably and pivotally secured to one side of the elongated handle and extends perpendicularly therefrom. A second support arm is positioned adjacent to the first support arm and is pivotally secured to the handle of the pot or pan. Each support arm can rotate between a folded configuration wherein the support arms are positioned on top of the elongated handle, and an extended configuration. In the extended configuration, the support arms can be used to hold a utensil therebetween and alongside of the handle and above the pot or pan. In this way, the present invention provides the user with a convenient means for holding a utensil so that the utensil is not placed on a countertop or stovetop, and is not disposed within the pot or pan.

DESCRIPTION OF THE PRIOR ART

Devices have been disclosed in the prior art that relate to utensil holding devices. These include devices that have been patented and published in patent application publications. These devices generally relate to utensil holding devices removably securable to the rim of a pot or pan. The following is a list of devices deemed most relevant to the present disclosure, which are herein described for the purposes of highlighting and differentiating the unique aspects of the present invention, and further highlighting the drawbacks existing in the prior art.

Such devices include U.S. Pat. No. 5,823,483 to Gaskill and U.S. Pat. No. 5,518,211 to Gaskill et al., which disclose a utensil holder for use with a vessel or other container. The utensil holder includes a device with an inner and outer spring arm adapted to engage the rim of a pot or pan. An upper clip is used to support a utensil above the pot or pan so that sauce or other substances on the utensil can drip into the pot or pan. Thus, Gaskill discloses devices for supporting a utensil on a pot or pan that is removably secured to the rim of the pot or pan, and fails to disclose a holding device integrated into the handle of a pot or pan.

U.S. Pat. No. 5,127,616 to Carney discloses a device for holding pot lids or cooking utensils. The device includes a notched planar element for supporting utensils and other objects. A second planar element is attached to the notched planar element and can be used to further support cooking utensils thereon. Thus, while Carney discloses a utensil holding device, the device is not integrated into the handle of a pot or pan, and does not include support arms used to hold the handle of a utensil.

U.S. Pat. No. 5,105,963 to Scott discloses a holding device for supporting a utensil on a pot or pan. The device supports a cooking utensil on the upper surface of the handle of a pot or pan, such that the head of the utensil is over the opening of the pot or pan. A means for releasably holding the utensil, such as a mechanical fastener, elastic fastener, or magnetic fastener is provided. While Scott discloses a holding device for utensils, Scott fails to disclose a holding device comprising a first and second support arm pivotally secured to a handle of a pot or pan that can be used to removably secure a cooking utensil.

U.S. Pat. No. 1,483,833 to Potter discloses a utensil holding device for use with pots or pans. The device comprises a spring clip adapted to engage the rim of a pot or pan. The spring clip includes a retainer thereon for engaging the handle of a cooking utensil. The retainer includes a slot on an edge thereof adapted to receive a portion of the handle of a utensil. The spring clip and retainer are preferably of unitary construction. Thus, Potter discloses a clip that can be used to support a utensil that is removably secured to the rim of a pot or pan, and fails to disclose a holding device integrated into the handle of a pot or pan.

Finally, U.S. Pat. No. 807,840 to Martin & Kennard discloses a utensil holding device for pots and pans. The device includes a clip member having an arm thereon. The clip can be secured to the rim of a pot or pan. The arm includes a slot or opening thereon for supporting a portion of a utensil. The device disclosed by Martin & Kennard fails to disclose a utensil holding device integrated into the handle of a pot or pan, and instead discloses a holding device removably secured to the rim of a pot or pan.

These prior art devices have several known drawbacks. Many devices in the prior art relate to holding devices securable to the rim of a pot or pan. Thus, the user is required to separately store a utensil holding device, and retrieve the device for use while cooking. Further, such devices generally hold a utensil by means of a clip which may not be suitable for all types of utensils, and which may not be able to support a utensil above the rim of the pot or pan. The present invention includes an integrated utensil holder so that a user is not required to use separate attachments when cooking. Further, the present invention uses a first and second support arm to loosely but securely hold a utensil, and that allows for easy placement and retrieval of a utensil while cooking. The present invention is adapted to support a utensil at a variety of angles so that the utensil is supported above the pot or pan, and is not disposed within the food inside the pot or pan.

In light of the devices disclosed in the prior art, it is submitted that the present invention substantially diverges in design elements from the prior art and consequently it is clear that there is a need in the art for an improvement to existing cooking utensil holding devices. In this regard the instant invention substantially fulfills these needs.

SUMMARY OF THE INVENTION

In view of the foregoing disadvantages inherent in the known types of cooking utensil holding devices now present in the prior art, the present invention provides a new cooking utensil holding device wherein the same can be utilized for providing convenience for the user when preparing food in a pot or pan on a stovetop.

It is therefore an object of the present invention to provide a new and improved cooking utensil holding device that has all of the advantages of the prior art and none of the disadvantages.

It is another object of the present invention to provide a cooking utensil holding device having a pair of support arms that are adapted to removably secure a utensil adjacent to the handle of a pot or pan for convenient access by the user.

Another object of the present invention is to provide a cooking utensil holding device integrated into the handle of a pot or a pan.

Yet another object of the present invention is to provide a cooking utensil holding device that is adjustable so that it may be used to support utensils of various shapes and sizes.

Another object of the present invention is to provide a cooking utensil holding device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
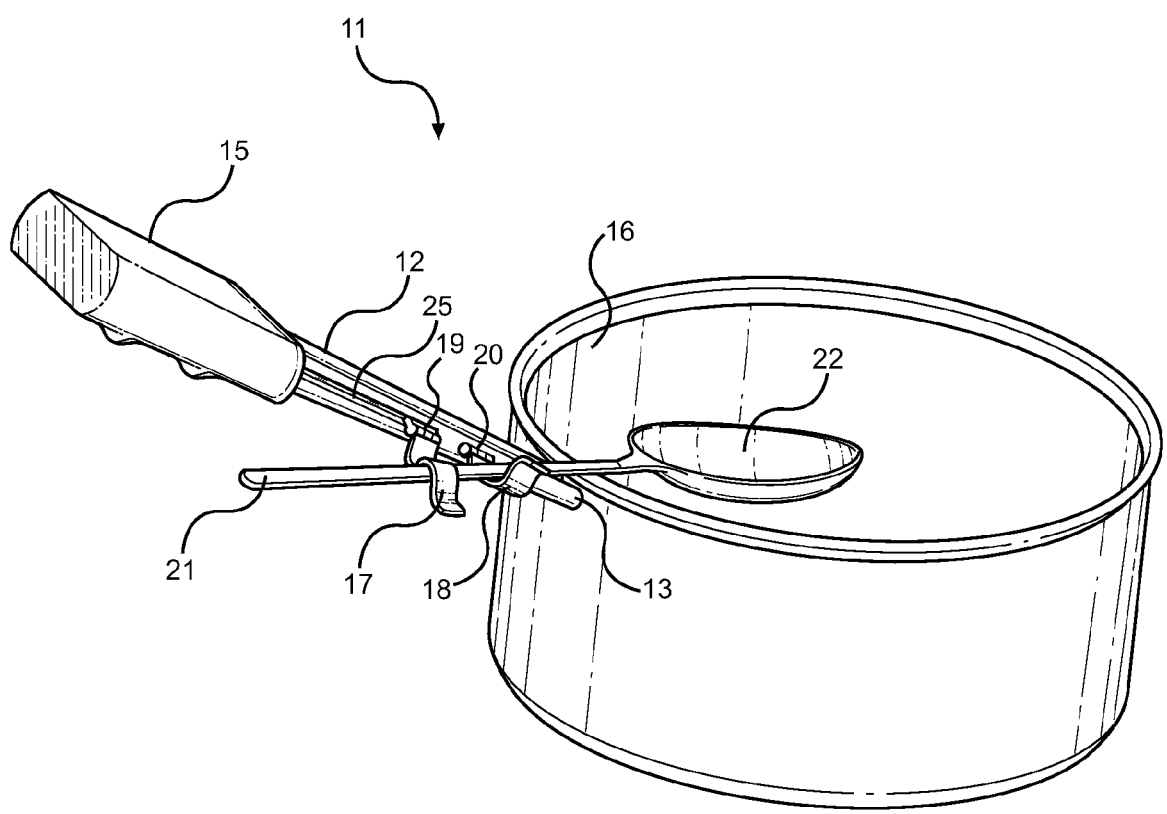
FIG. 1 shows a perspective view of an embodiment of the cooking utensil holding device of the present invention as used to hold a utensil thereon.

Reference is made herein to the attached drawings. Like reference numerals are used throughout the drawings to depict like or similar elements of the cooking utensil holding device of the present invention. For the purposes of presenting a brief and clear description of the present invention, the preferred embodiment will be discussed as used for supporting a cooking utensil alongside the handle of a pot or pan for the convenience of the user. The figures are intended for representative purposes only and should not be considered to be limiting in any respect.

Referring now to FIG. 1, there is shown a perspective view of an embodiment of the cooking utensil holding device of the present invention as used to hold a utensil thereon. The cooking utensil holding device 11 of the present invention comprises a container or vessel 16, such as a pot, pan, or the like, having an elongated handle 12 thereon. The elongated handle 12 includes a first end 13 permanently affixed to the vessel 16. The second end 15 of the elongated handle 12 includes a grip thereon that a user can use to hold the pot or pan. The grip may be composed of rubber silicone, or another non-slip, high-friction material. The grip may further be heat resistant so that it does not easily melt or become otherwise damaged from exposure to heat.

The elongated handle 12 includes a first support arm 17 and a second support arm 18 pivotally secured thereto. The first and second support arms 17, 18 are adapted to support a cooking utensil 21 alongside of the elongated handle 12 such that the head 22 of the cooking utensil 21 is elevated above the vessel 16 and does not contact the same. In this way, any residual food on the utensil 21 will drip into the vessel 16. Further, the cooking utensil 21 is conveniently accessible by the user. Preferably, the cooking utensil 21 is supported so that it does not contact the vessel 16 of the pot or pan, and is preferably disposed outside of the food within the pot or pan so that the utensil 21 is not exposed to excessive heat.

The first and second support arms 17, 18 are pivotally secured to a side portion of the elongated handle 12 and are substantially parallel to one another and perpendicular to the elongated handle 12. The first and second support arms 17, 18 are preferably composed of, or coated with, a non-slip, high-friction material such as rubber or silicone. Further, the support arms 17, 18 may be treated with a heat-resistant coating. In this way, a utensil secured between the support arms 17, 18 is held securely on the support arms 17, 18 and is prevented from sliding into the vessel of the pot or pan.

The second support arm 18 is disposed closer to the first end 13 of the elongated handle 12 than is the first support arm 17. The first support arm 17 is pivotally secured to the elongated handle 12 by means of a hinge 19. Similarly, the second support arm 18 is secured to the elongated handle 12 by means of a hinge 20. The first support arm 17 and the second support arm 18 are arranged perpendicularly to the handle 12 and extend outward therefrom. Further, the first and second support arms 17, 18 are secured to an outer portion of the elongated handle 12. The first and second support arms 17, 18 each comprise an arcuate shape adapted to cradle the handle of a cooking utensil therebetween.

Preferably, the first support arm 17 comprises a recessed portion in which a portion of a handle of a cooking utensil 21 can be positioned. Thus, the first support arm 17 is adapted to rest on the upper surface of a cooking utensil 21. In some embodiments of the present invention, the first support arm 17 is also slidably connected to the elongated arm 12 and is adapted to slide within a channel 25 thereon. In this way, the distance between the first support arm 17 and second support arm 18 can be adjusted. This allows the utensil holding device to be used to support utensils of various shapes and sizes at various angles.

Figure 2:
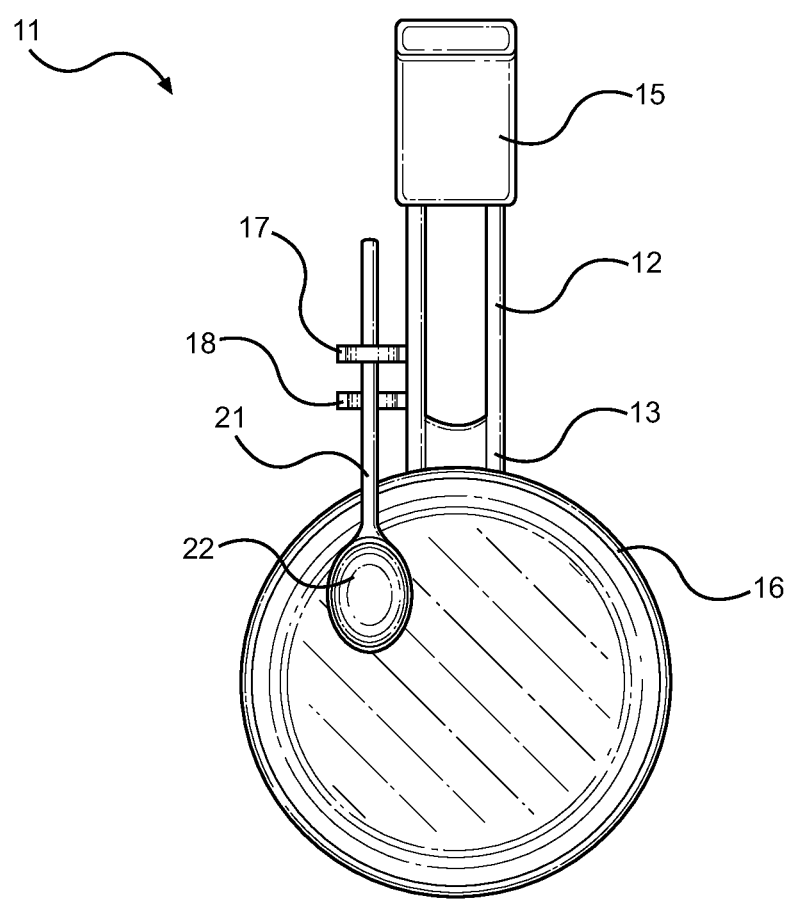
FIG. 2 shows a top-down view of an embodiment of the cooking utensil holding device of the present invention as used to hold a utensil thereon.

Referring now to FIG. 2, there is shown a top-down view of an embodiment of the cooking utensil holding device of the present invention as used to hold a cooking utensil thereon. In operation, the handle of a cooking utensil 21 can be positioned on the upper surface of the second support arm 18. However, the second support arm 18 alone is not sufficient to support a cooking utensil 21. Thus, the first support arm 17 is provided and is adapted to be positioned over the handle of the cooking utensil 21. In this way, the handle of the cooking utensil 21 is disposed between the first and second support arms 17, 18. When the cooking utensil 21 is removably positioned between the first and second support arms 17, 18, the handle of the cooking utensil is substantially parallel to the elongated handle 12 of the pot or pan. Further, the head 22 of the cooking utensil is positioned over the vessel 16 of the pot or pan, so that any residual food thereon may drip into the vessel 16. Further, the elongated handle 12 is fully accessible by the user, and the user is not prevented from holding or moving the pot or pan via the handle 12.

Figure 3A:
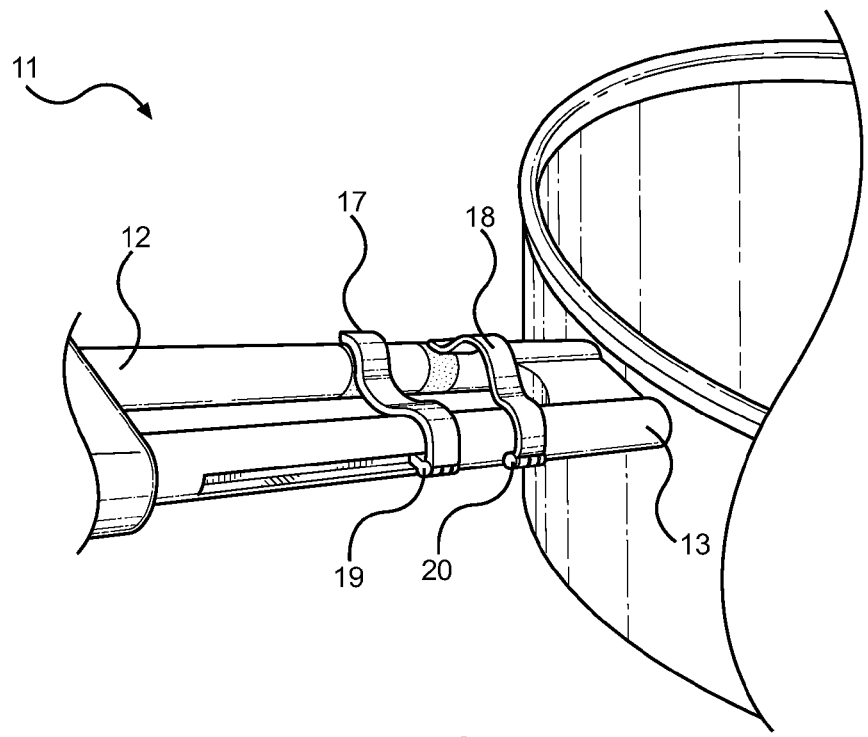
FIG. 3A shows a perspective view of an embodiment of the cooking utensil holding device in a folded configuration.
Figure 3B:
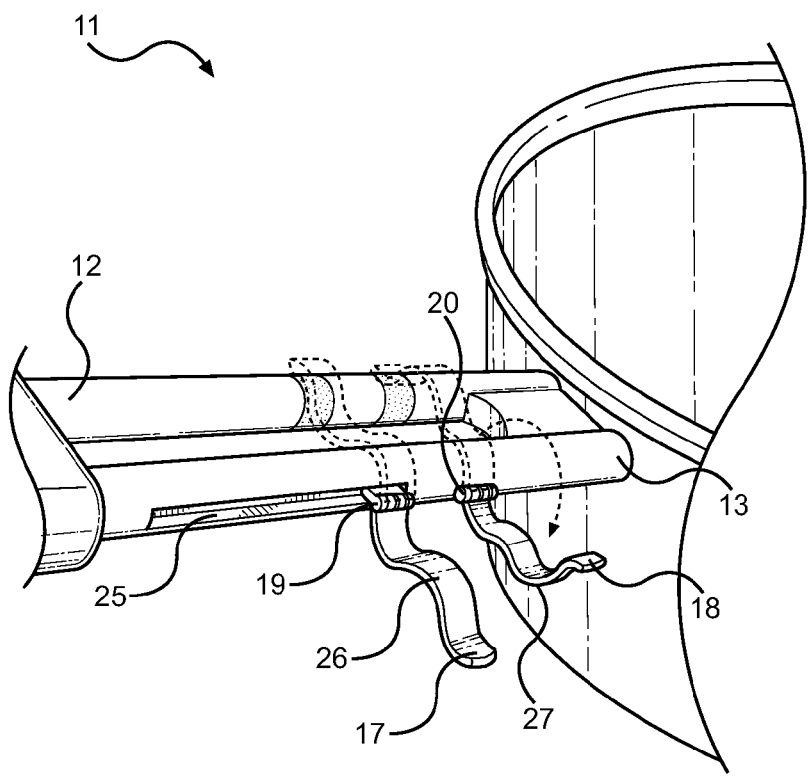
FIG. 3B shows a perspective view of an embodiment of the cooking utensil holding device in an extended configuration.

Referring now to FIGS. 3A and 3B, there is shown a perspective view of an embodiment of the cooking utensil holding device in a folded and extended configuration, respectively. The first and second support arms 17, 18 are adapted to pivot between a folded and an extended configuration. The first and second support arms 17, 18 are substantially perpendicular to the elongated handle 12 of the pot or pan. In the folded configuration, the first and second support arms 17, 18 are disposed on top of the handle 12 so as to provide a compact configuration, wherein the first and second support arms 17, 18 do not extend outward from the elongated handle 12.

In an extended configuration, the first and second support arms 17, 18 are rotated so as to extend outward from the elongated handle 12. The first and second support arms 17, 18 can be positioned so that they are substantially horizontal. Further, the hinges 19, 20 prevent the first and second support arms 17, 18 from rotating beyond a horizontal position.

The first support arm 17 comprises an arcuate shape and has a recessed portion 26 adapted to receive a portion of a handle of a utensil therein. The recessed portion 26 helps to maintain the handle of a utensil in position on the first support arm 17 and prevents the handle from slipping off of the support arm. Similarly, the second support arm 18 comprises an arcuate shape and includes a recessed portion 27 thereon. However, the recessed portion 26 on the first support arm 17 is adapted to be disposed over the top of a handle of a utensil, whereas the recessed portion 27 on the second support arm 18 is adapted to be disposed underneath the handle of the utensil.

Further, the first support arm 17 can be moved along the length of the elongated handle 12 within a channel 25. The hinge 19 of the first support arm 17 is disposed within a channel 25 and can move therein. In this way, the separation between the first and second support arm 17, 18 can be adjusted so as to allow the utensil holding device 11 to hold utensils of various lengths and sizes at a variety of angles.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A utensil holding device, comprising:
    a vessel having a handle extending therefrom;
    a first support arm pivotally secured to said handle by a first hinge;
    the first hinge disposed within a channel of said handle and slidable therein;
    the first support arm comprising a first arcuate portion curved in a first direction;
    a second support arm pivotally secured to said handle by a second hinge;
    wherein the first support arm and the second support arm each extend perpendicularly from the handle;
    wherein the first hinge and the second hinge respectively prevent the first support arm and the second support arm from rotating beyond a horizontal position;
    the second support arm comprising a second arcuate portion curved in a second direction, the second direction opposite to the first direction;
    wherein the first arcuate portion and the second arcuate portion are configured to support a utensil handle therebetween when each portion is in a pivoted position from the handle; and
    whereby a distance between the first support arm and the second arm can be adjusted by sliding the first hinge along the channel so that the utensil holding device is configured to support utensils of various shapes and sizes at various angles.

2. The utensil holding device of claim 1, wherein the first support arm and the second support arm are configured to support the utensil handle above a rim of the vessel.

* * * * *